Figure 1:
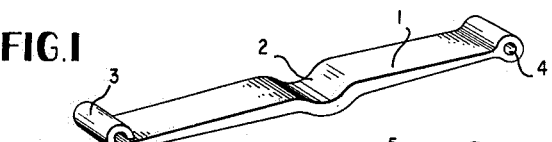

June 22, 1965  B. BARÉNYI  3,190,632

SPRING ARRANGEMENT

Filed March 15, 1963

INVENTOR.
BELA BARENYI
BY Dicke & Craig
ATTORNEYS 3,190,632
SPRING ARRANGEMENT
Béla Barényi, Stuttgart-Vaihingen, Germany, assignor to Daimler-Benz Aktiengesellschaft, Stuttgart-Unterturkheim, Germany
Filed Mar. 15, 1963, Ser. No. 265,473
Claims priority, application Germany, Mar. 20, 1962, D 38,406
14 Claims. (Cl. 267—1)

The present invention relates to a spring arrangement having parallel or rhomboidal leaf springs with uniform wall thickness throughout or with a wall thickness increasing toward the center.

Such types of leaf spring should be at the connecting or clamping places thereof as free as possible of apertures, projections, extensions, cut-outs or indentations, which intersect or cut the structure or grain flow of the material because such apertures, extensions, projections, cut-outs or indentations may easily form the starting point for cracks whereby the danger of breakage or rupture is considerably increased with such springs.

The present invention aims at so constructing the leaf springs, avoiding such apertures, projections, extensions, cut-outs or indentations, that they may be securely fastened or supported at the clamping or connecting places thereof.

The present invention essentially consists of providing the springs within the area of the center thereof with one or two grooves, channels, bulged portions or eye portions directed transversely to the spring. The springs may then be secured or clamped in a simple manner by means surrounding the outer surfaces of the grooves, of the bulged portions or eye portions or may be secured or supported on bolt members which extend through the eye portions thereof. The eye portions may thereby have a cross section which is circular, horizontally disposed oval or corresponding to a hollow triangular cross-section.

According to a further feature of the present invention, the springs may be advantageously secured or clamped or supported by the interposition of elastic means. Furthermore, it may be of advantage in certain cases to arrange two leaf springs one next to the other and to combine the same into a twin leaf-spring element.

Such an arrangement assures an increased safety and additionally makes it possible to locate between the ends of the spring the receiving places for accommodating the element or elements to be spring-supported. This is particularly appropriate with the use of rhomboidal leaf springs.

Accordingly, it is an object of the present invention to provide leaf springs of the type described hereinabove which effectively eliminate the aforementioned disadvantages encountered with the prior art constructions and reduce the danger of crack formation.

Another object of the present invention resides in the provision of a leaf spring arrangement which may be readily supported or secured without the need of apertures, projections, extensions, indentations or the like that constitute the starting point for cracks leading to rupture or breaking of the spring.

Still another object of the present invention resides in the provision of a leaf spring of either parallel or rhomboidal shape which facilitates, both from a mechanical and spatial point of view, the safe fastening thereof, particularly by the interposition of elastic means, to the parts spring-supported thereby.

Figure 2:
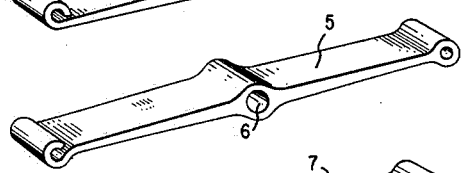
Figure 3:
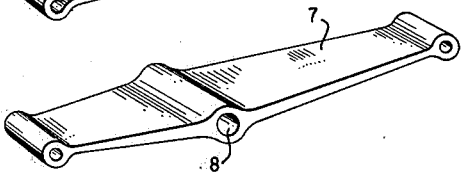
Figure 4A:
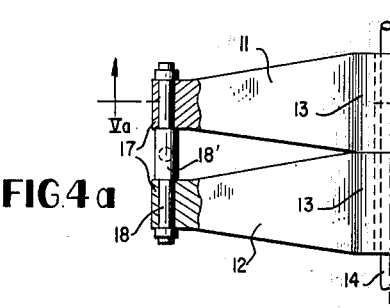
Figure 4B:
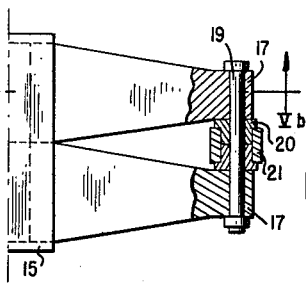
Figure 5A:
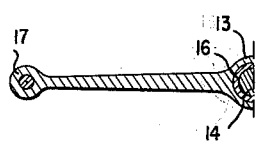
Figure 5B:
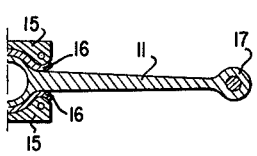
Figure 6:
Figure 7:
Figure 8:

These and other objects, features and advantages of the present invention will become more obvious from the following description when taken in connection with the accompanying drawing which shows, for purposes of illustration only, several embodiments in accordance with the present invention and wherein:

FIGURES 1 to 3 are perspective views of three different embodiments of a leaf spring construction in accordance with the present invention, FIGURE 4a is a partial plan view, partly in cross section, of a twin arrangement of rhomboidal leaf springs in accordance with the present invention, FIGURE 4b is a partial plan view, partly in cross section and similar to FIGURE 4 of a modified embodiment of a twin arrangement of rhomboidal leaf springs, FIGURE 5a is a partial longitudinal cross sectional view taken along V—V of FIGURE 4a, FIGURE 5b is a partial longitudinal cross sectional view through the leaf spring arrangement of FIGURE 4b, FIGURES 6 and 7 are partial elevational views of two different embodiments of leaf-spring eye portions in accordance with the present invention, and FIGURE 8 is a side view of a leaf spring in accordance with the present invention provided with two eye portions in the area of the center thereof.

Referring now to the drawing wherein like reference numerals are used throughout the various views to designate like parts, and more particularly to FIGURE 1, reference numeral 1 designates therein a parallel leaf spring the wall thickness or wall strength of which increases from the ends thereof toward the center. The leaf spring 1 is provided in the center thereof with a groove or channel 2 directed transversely to the spring which enables a facilitated fastening or clamping of the spring. The counter bearings of the spring used for that purpose are so matched to the form and contours of the channel or groove 2 that, on the one hand, they surround the channel or groove 2, and, on the other, engage into the same. As a result thereof, the spring 1 is immovably retained in its position. At the ends thereof, such a leaf spring 1 may be provided, for example, with rolled-over eyelets or lug portions 3 or with eye portions 4 which make it possible to secure thereto the elements to be spring-supported by the spring.

The leaf spring 5 of FIGURE 2 is provided in the center thereof, instead of with a groove, with an eye portion 6 of circular cross section and extending transversely to the spring 5. Such a spring may be either secured or supported on a bolt or may be retained by means which, similar as with the channel or groove 2 of FIGURE 1, surround the outer surfaces of the eye portion 6. In that case, instead of the eye portion 6, only a bulged portion would be necessary.

FIGURE 3 shows an unsymmetrical rhomboidal leaf spring 7 provided with an eye portion 8 arranged outside of the center thereof.

While in FIGURES 1 and 2 the connecting means at the left and right hand ends are shown different, it is understood that the two sides may be also made identical by utilizing either the lug portions 3 or the eye portions 4 at both ends. By the same token, the leaf spring shown in FIGURE 3 may also be made with a lug portion 3 at one or both ends thereof.

In FIGURES 4a, 4b, 5a and 5b, particularly appropriate spring arrangements are illustrated in which two rhomboidal leaf springs 11 and 12 are combined into a twin spring element. These leaf springs are provided in the center thereof with one eye portion 13 each and are arranged one next to the other in such a manner that they may be retained by the same securing means. As securing means may be used, for example, a bolt member 14 which extends through the two aligned eye portions 13 as shown in FIGURES 4a and 5a. Instead, a common clamping element 15 may also be used with both springs 11 and 12 which surrounds the outer surfaces of the eye portions 13 as illustrated in FIGURES 4b and 5b. Elastic means 16 of any known material are interposed between the inner surfaces of the eye portions 13 and the bolt members 14 (FIGURES 4a and 5a) or between the outer surfaces of the eye portions 13 and the clamping elements 15 (FIGURES 4b and 5b).

The rhomboidal leaf springs 11 and 12 are also provided at the ends thereof with eye portions 17 through which extend the common bolt members 18 and 19. By reason of the rhomboidal shape of the leaf springs 11 and 12, sufficient space remains between the ends thereof in order to secure thereat the elements to be spring-supported on the bolts 18 and 19. In FIGURES 4a and 5a, the bolt member 18 is provided within the area between the leaf springs 11 and 12 with a part 18' of enlarged diameter having a cross bore on which the element to be spring-supported is secured. Instead, the bolt member 19 may also have the same diameter throughout (FIGURES 4b and 5b) and supports intermediate the ends of leaf springs 11 and 12 a bearing bushing 20 for the element 21 to be spring-supported. The bearing bushing 20 may also be made of elastic material. While FIGURES 4a and 5a and FIGURES 4b and 5b only show one half of a leaf spring, it is understood that the other half of each spring is of mirror image like construction though, of course, the eye portions 13 need not necessarily be located exactly in the center of each spring.

If the leaf springs are to be fixedly retained in the center thereof, it is appropriate to provide the leaf springs with eye portions of which the cross section is different from the circular shape. FIGURE 6 shows a part of a leaf spring provided with a horizontally disposed oval eye portion whereas the eye portion of the leaf spring of FIGURE 7 has a hollow triangular cross section of which two sides are substantially equal. This cross sectional construction has particularly favorable characteristics and properties with respect to the transmission of torsional forces.

FIGURE 8 shows a leaf spring with two eye portions 22 arranged symmetrically with respect to the center thereof. Particularly favorable spring characteristics result from securing such a spring at two places spaced from each other.

While I have shown and described several embodiments in accordance with the present invention, it is understood that the same is not limited thereto but is susceptible of numerous changes and modifications within the spirit and scope thereof and I, therefore, do not wish to be limited to the details shown and described herein but intend to cover all such changes and modifications as are encompassed by the scope of the appended claims.

I claim:

1. A spring arrangement constituted by a single individual leaf spring of rhomboidal shape,
    said leaf spring having a wall thickness that increases in directions toward the mid-portion of the spring,
    said mid-portion being provided with eye means extending lengthwise through said mid-portion in the longitudinal plane of the spring in a direction transverse to the lengthwise dimension of the spring,
    and securing means including bolt means extending through said eye means.

2. A spring arrangement according to claim 1, wherein said eye means comprises an eye portion having a round cross-section.

3. A spring arrangement according to claim 1, wherein said eye means comprises an eye portion of oval cross section, the greatest dimension of said oval cross section extending in the direction of the length of said leaf spring, said bolt means having an oval cross section engaging said eye portion.

4. A spring arrangement according to claim 1, wherein said eye means comprises a cross-sectional portion shaped in the form of a hollow triangle.

5. A spring arrangement according to claim 4, wherein said bolt means comprises a bolt of a cross-sectional shape corresponding to the interior of said hollow triangle.

6. A spring arrangement comprising two individual leaf springs of rhomboidal shape,
    each of said leaf springs having a wall thickness increasing in directions toward the mid portion of the spring,
    said mid portion of each of said leaf springs being provided with eye means extending lengthwise through said mid-portion transversely to the lengthwise dimension of the spring and in the longitudinal plane of said spring,
    said springs being disposed in contacting side-by-side relationship in positions in which the said longitudinal planes of both of said springs are substantially coincidental.

7. A spring arrangement according to claim 6, wherein securing means including bolt means extend through said eye means, said bolt means including a bolt member common to both of said eye means.

8. A spring arrangement according to claim 7, wherein said eye means of both of said leaf springs comprise eye portions receiving said bolt member,
    said eye portions having mutually contacting registering end portions.

9. A spring arrangement according to claim 6, wherein said springs in said positions have mutually adjacent longitudinal edges, said edges diverging from each other from each said mid portion towards the outer ends of spring springs.

10. A spring arrangement according to claim 6, wherein said springs have end portions mutually spaced from each other in the direction of width of said springs.

11. A spring arrangement according to claim 10 wherein the lateral edge portions of said mid portions of each said spring are in mutually contacting relationship,
    and said end portions are connected by a bolt, said bolt being provided midway of its ends with means adapted for connection to elements to be spring-supported by said leaf springs.

12. A spring arrangement according to claim 11, wherein said means adapted for connection comprise an enlarged portion of said bolt having a cross bore therethrough.

13. A spring arrangement according to claim 11 wherein said means adapted for connection comprise a bearing bushing surrounding said bolt.

14. A spring arrangement comprising:
    a single leaf spring having spaced portions of uniform thickness,
    means separating said portions including two eye means comprising eye portions having bores therein adapted to receive bolts,
    said eye portions extending in the directions of their lengths transverse to the longitudinal dimension of said leaf spring, said eye portions being located in the mid portion of said leaf spring.

References Cited by the Examiner

UNITED STATES PATENTS

| | | | |
|---|---|---|---|
| 305,241 | 9/84 | Saladee | 267—38 |
| 1,207,992 | 12/16 | Owen | 267—47 |
| 1,208,990 | 12/16 | Laycock | 267—47 |
| 1,237,655 | 8/17 | Koeb | 267—41 |
| 1,363,800 | 12/20 | McIntyre | 267—41 |
| 1,576,920 | 3/26 | Lundelius | 267—52 |
| 2,308,695 | 1/43 | Johnson | 267—1 X |
| 2,505,733 | 4/50 | Famiglietti | 267—38 X |
| 2,643,111 | 6/53 | Burton | 267—52 |
| 2,654,597 | 10/53 | Barenyi | 267—52 X |
| 2,762,445 | 9/56 | Polhemus et al. | 267—52 X |
| 2,952,455 | 9/60 | Neuville et al. | 267—38 X |

FOREIGN PATENTS 1,131,187  10/56  France.

ARTHUR L. LA POINT, *Primary Examiner.*